March 20, 1934.  P. W. JUDAH  1,951,871
AUTOMOBILE ACCESSORY
Filed Oct. 13, 1932
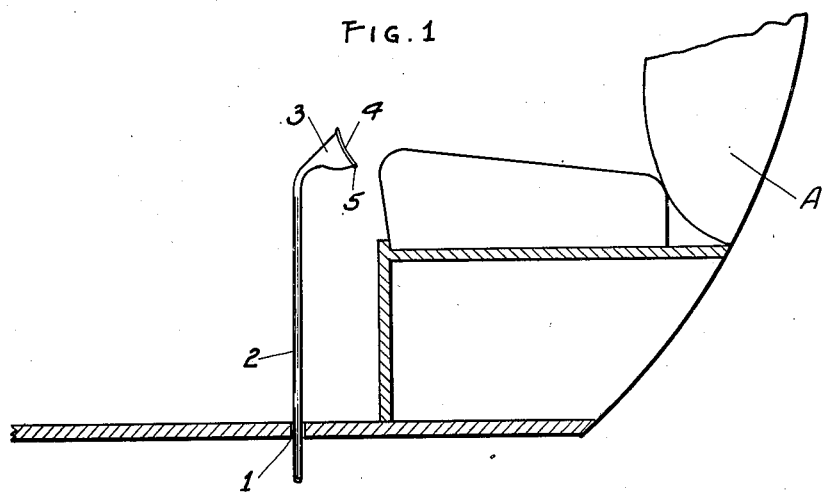
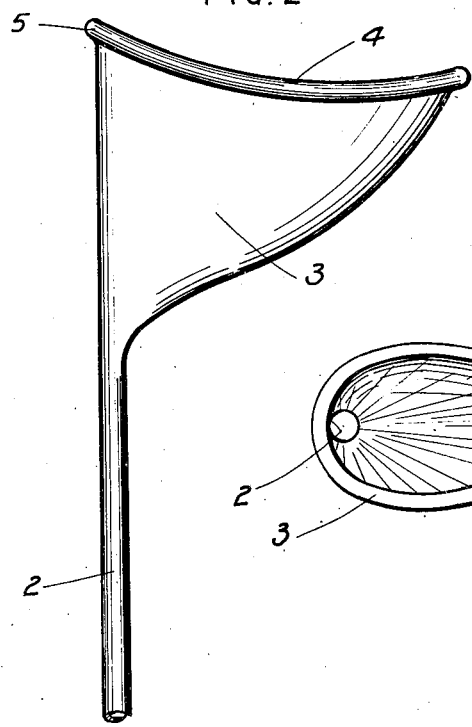
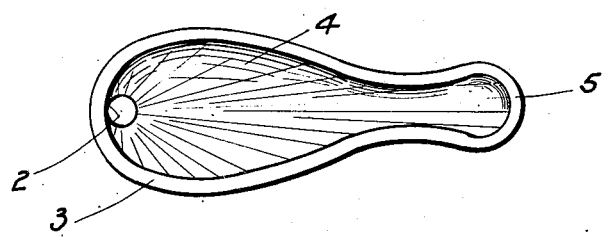
Inventor
PARK W. JUDAH
By:- Ben V. Zillman
Attorney Patented Mar. 20, 1934

1,951,871

UNITED STATES PATENT OFFICE 1,951,871

AUTOMOBILE ACCESSORY

Park W. Judah, St. Louis, Mo.

Application October 13, 1932, Serial No. 637,590

1 Claim. (Cl. 4—110)

My invention relates to improvements in an automobile accessory, and more particularly to a device adapted to be used as a urinal by the occupants of an automobile while the same is traveling upon the highway.

The invention has among its objects, the production of an article of the kind described, which shall be of light weight, durable and sturdy, compact, neat in appearance and occupying a minimum amount of storage space within the automobile, and which will be sanitary, efficient and satisfactory for use wherever found applicable.

The invention has among its other objects the manufacture of a device of the kind described, which shall be adaptable for use by either sex, and which will not cause any discomfort to the user while using the same.

Another object of my invention is to provide a urinal of the kind described, which may be folded or collapsed while not in use, but when placed in position for service, will have its top opening of such size and shape as to best adapt it for the use intended.

Many other objects and advantages of the construction herein shown and described, and the uses mentioned, will be obvious to those skilled in the art to which this invention appertains, from the disclosures herein given.

To this end, my invention consists in the novel construction, arrangement, and combination of parts herein shown and described, and more particularly pointed out in the claim.

In the drawing, wherein like reference characters indicate like or corresponding parts throughout the views, Figure 1 is a fragmentary section view of an automobile, showing the device in position for use;

Figure 2 is a side elevation of the device; and

Figure 3 is a top plan view of the same.

Referring more particularly to the drawing, wherein I have illustrated a preferred embodiment of my invention, A indicates an automobile of any size, shape or construction and is provided with an aperture 1 through the floor of the same providing access therethrough to the roadway therebelow, as will be hereinafter set forth.

While traveling upon the highways by automobile, and especially so when traveling with children, elderly people, and others, stops have to be made frequently to accommodate such passengers, and as suitable comfort stations are not always near, much discomfort is suffered by these passengers, and the pleasure of the riding is interfered with. Therefore, I have produced a device, which is inconspicuously placed in one of the side pockets of the automobile, or elsewhere, when not in service, but which will enable the urination therethrough onto the roadway therebelow without stopping the travel of the vehicle, and which at the same time will be comfortable to the users thereof, both male and female.

The device proper-consists of a suitable length of flexible and preferably rubber tubing 2, of a size to be easily insertable through the aperture 1 hereinbefore mentioned, the upper end of which has the urinal element 3 connected thereto and communicating therewith.

The urinal element 3 is also of some soft, impervious, flexible material, such as soft rubber, so that it can be collapsed or folded together when not in service. The same is preferably elongated in shape, extending from the tube 2 in a direction rearwardly thereof, and having the open end or mouth 4 adapted to be placed adjacent the body of the user.

The forward portion of the mouth is wider than the rearward portion or end, inasmuch as the narrower or rear end is adapted to be placed between the legs of the user, especially when they are women, and this decrease in width will be more comfortable than if the width were uniformly large from the front to the rear. Further, the major portion of the urine as expelled into the urinal element enters the same adjacent the forward end of the element. The uppermost or bounding edge of the urinal element is preferably convex, extending upwardly from the rear to the front thereof.

In order to maintain the mouth of the urinal in its open, or normal position, I have provided a band or ring 5 about the same, as of soft rubber moulded to the desired outline, having the one end with a smaller opening thereacross than at the forward end. This ring will distend the top or mouth of the urinal to the shape set forth, but when it is desired to place the device out of the way, will not interfere with the folding or collapsing of the latter, and will instantly expand the same to proper position when the device is again unfolded.

Having thus described my invention, it is obvious that various immaterial modifications may be made in the same without departing from the spirit of my invention; hence I do not wish to be understood as limiting myself to the exact form, arrangement, construction, and combination of parts herein shown and described, or the uses mentioned, except as limited by the state of the art to which this invention appertains, and the claim hereunto appended.

What I claim as new and desire to secure by Letters Patent is:

An article of the kind described and for the purpose set forth, comprising a flexible tubing adapted to communicate with an aperture in an automobile, a urinal connected to the upper end of said tubing and having an elongated normally open mouth narrower adjacent its rear end than adjacent its front end to permit said rear end to be more easily placed in position by the user, and narrowest at a point intermediate said front and rear.

PARK W. JUDAH.